United States Patent [19]

Travnicek

[11] 3,996,187

[45] Dec. 7, 1976

[54] OPTICALLY CLEAR FILLED SILICONE ELASTOMERS

[75] Inventor: Edward A. Travnicek, Worcester, Mass.

[73] Assignee: American Optical Corporation, Southbridge, Mass.

[22] Filed: Apr. 29, 1975

[21] Appl. No.: 572,788

[52] U.S. Cl. .................................. 260/37 SB
[51] Int. Cl.² ................................ C08L 83/04
[58] Field of Search .......... 260/37 SB, 46.5 G, 825; 351/160

[56] References Cited

UNITED STATES PATENTS

| | | | |
|---|---|---|---|
| 3,341,490 | 9/1967 | Burdick et al. | 260/37 SB |
| 3,457,214 | 7/1969 | Modic | 260/825 X |
| 3,518,324 | 6/1970 | Polmanteer | 260/825 |
| 3,607,972 | 9/1971 | Kiles et al. | 260/825 |
| 3,624,023 | 11/1971 | Hartlage | 260/37 SB |

*Primary Examiner*—Lewis T. Jacobs
*Attorney, Agent, or Firm*—Albert H. Graddis; Frank S. Chow

[57] ABSTRACT

Reinforced silicone elastomers, having improved tensile strength and particularly tear strength, include at least copolymers of aryl siloxanes and alkyl siloxanes, in a particular ratio of aryl to alkyl substituents, having reflective indices matched to the index of refraction of a silicone filler, forming optically clear material, useful for soft contact lenses.

2 Claims, No Drawings

OPTICALLY CLEAR FILLED SILICONE ELASTOMERS

FIELD OF THE INVENTION

This invention relates to optically clear, reinforced, inter-polymers of aryl and alkyl siloxanes, forming silicone elastomeric, soft plastic contact lenses.

BACKGROUND OF THE INVENTION

Many silicone elastomers, when unfilled, generally have excellent optical clarity and are usually water white in color. The tensile strength, and especially the tear strength, of such elastomers is poor, however. By filling the elastomers with fine particulate solids, the silicone gum stock will produce, when vulcanized and cured, an elastomer with much improved strength. Fillers used with the silicone elastomers have been the usual fillers for plastics, but the fillers are limited when optical clarity of the elastomer is an essential. Commonly used dimenthyl siloxane, with a vulcanizing agent, produces a silicone elastomer, but for satisfactory use it needs a filler for strength. One filler used for silicone elastomers is finely divided silica, known as smoke or fume silica. This filler when added to dimethyl siloxane elastomer, or gum stock and then vulcanized, produces a translucent elastomer, generally useless for objects needing clarity, such as lenses.

In U.S. Pat. No. 3,341,490, there is described a blend of vinyl-type siloxane units which may be filled with a silica filler, forming, after vulcanizing and curing, products which are useful in the manufacture of articles having optical clarity.

THE INVENTION

The present invention provides, in one form, for making copolymers of diphenyl siloxane and dimethyl siloxane, in about a ratio of twelve mole percent of phenyl to methyl groups in the copolymer. This invention also includes a reenforced silicone type, soft plastic contact lens containing about 6% to about 16% mole of aryl groups comprising a copolymer of a. an aryl siloxane,
b. an alkyl siloxane, and
c. a silica filler, said lens being characterized by the silicone copolymer having essentially the same refractive index as the silica filler, forming a transparent, optically clear lens. In a broader aspect of the invention, an aryl siloxane and an alkyl siloxane are copolymerized to produce a silicone elastomer having a ratio of about twelve mole percent of the aryl to the alkyl groups, providing a silicone elastomer in which the refractive index substantially matches that of the silica filler, making a transparent or substantially transparent mixture with the filler. Minor variations in the compositions will have a slight effect upon optical clarity. Since mixtures of highly arylated silicone oils or gums are generally not miscible with the alkyl siloxanes, copolymers must be used. Mixtures of two or more silicones containing nearly the same aryl-alkyl (phenyl-methyl) ratio can be mixed to obtain the precise refractive indices to match the silica filler. The optical dispersions will not normally match perfectly, but the matches are close enough to rarely interfere with optical clarity of the intended articles.

OBJECTS OF THE INVENTION

One of the objects of the present invention is to produce a silicone elastomer of aryl siloxane and alkyl siloxane containing an aryl-alkyl group ratio providing a refractive index which substantially matches the index of refraction of a filler to be used with the elastomer.

Another object of the invention is to provide copolymers of diphenyl siloxane and dimethyl siloxane containing about twelve mole percent diphenyl groups to the methyl groups having a refractive index substantially matching that of a fume silica filler.

Another object of the invention is to provide optically clear silica filled silicone elastomers formed of aryl and alkyl siloxanes.

These and other objects of the invention may be ascertained by referring to the following description and appended claims which set forth the general invention.

SPECIFIC INVENTION

Generally, a copolymer of an aryl siloxane and an alkyl siloxane containing about twelve mole percent of the aryl groups will have a refractive index which will substantially match that of a fume silica filler, making the elastomeric product transparent or substantially transparent. In one specific case, a copolymer of diphenyl siloxane and dimethyl siloxane containing about twelve mole percent of the diphenyl groups with a balance of dimethyl groups produces a product which will be essentially transparent with a fume silica filler. Also, a copolymer of phenyl-methyl siloxane (about twenty-four mole percent) with dimethyl siloxane produces a copolymer (containing about the same proportion of phenyl and methyl groups) product having a refractive index which will match that of the fume silica filler. Other co- or ter-polymers, containing the same proportion of phenyl and methyl groups will produce products which are transparent with the fume silica fillers. Minor variations in the composition of the polymers have a slight effect upon optical clarity. Ethyl or other alkyl groups may be substituted for the methyl groups in the dimethyl siloxane, and other aryl groups may be substituted for the phenyl or diphenyl groups of the siloxane including phenyl-alkyl, naphthyl, toluyl, xylyl, chlorophenyl, etc., may be substituted for part or all of the phenyl in the siloxane groups. Minor adjustments in the mole ratio of aryl to alkyl groups may be necessary to achieve a proper refractive index which matches the silica filler. With naphthyl, in particular, only about six mole percent would be required.

To further illustrate the practice of this invention, the following examples are included:

Dow Corning silicone oils, known as DC 550 and DC 560 were found to be miscible in all proportions. The silicone oil DC 560 has an index of refraction of $N_D^{20} = 1.436$, while silicone oil DC 550 has an index of refraction of $n_D^{20} = 1.4935$. Either of these oils singly, when mixed with about six percent, by weight, of fume silica, produced a suspension that was hazy and not optically clear. Mixtures of DC 560 and DC 550 were made in various mixtures and each was mixed with about six percent by weight of treated fume silica. It was found that fume silica treated with trimethyl silyl was much easier to disperse than the untreated fume silica. A mixture containing about 35 parts by volume of DC 550 and 65 parts by volume of DC 560 mixed with about six percent by weight of treated fume silica gave excellent optical clarity, even when backlighted with a small spotlight. This mixture had a calculated refractive index of 1.455. Mixtures varying ±5% volume of DC 550 oil had almost as good optical clarity. These mixtures varied in index of refraction by a calculated ±0.0025. A variation in the index refraction of ±0.004 for the mixtures had a very perceptible haze when sidelighted.

EXAMPLE 2

A gum containing only dimethyl siloxane with a trace (0.1 mole percent) of vinyl methyl siloxane when mixed with fume silica produced an unacceptable hazy material. The refractive index was $n_D^{23} = 1.4045$ for this material. Another siloxane gum containing seven percent mole diphenyl siloxane, 0.1% vinyl methyl siloxane, and the balance dimethyl siloxane terpolymer, had a refractive index of $n_D^{23} = 1.4320$, when mixed with treated fume silica. This produced a material with a much improved clarity. However, this was not as good as that of the oil mixture cited above with a refractive index of $n_D^{20} = 1.455$. In each case the gum with the treated silica reinforcing fillers were mixed with about 0.5 to 2.5 parts of an organic peroxide vulcanizing agent (these being commercially known) and the copolymer or terpolymer blends of the process are vulcanized by conventional techniques. For example, the blends might be vulcanized by irradition or with a known peroxide, vulcanizing agent, employing the usual methods.

In the main, an aryl monomer and an alkyl monomer are mixed and polymerized in such proportions as to provide an elastomer having a refractive index which matches that of a silica filler to obtain optically clear material suitable for contact lenses.

I claim:
1. A reenforced vulcanized silicone lens consisting of 80 to 95% of (A) at least one copolymer comprising dimethyl siloxane and at least one siloxane selected from the group consisting of diphenyl siloxane and phenylmethyl siloxane, said copolymer having 6 to 16 mole % phenyl groups and at least one organo group bonded to substantially every silicon atom, and 5 to 20% of (B) fume silica, the index of refraction of (A) being substantially the same as the index of refraction of (B) whereby said lens is optically clear.
2. The lens of claim 1 wherein A contains two copolymers.

* * * * *